Patented Sept. 14, 1954

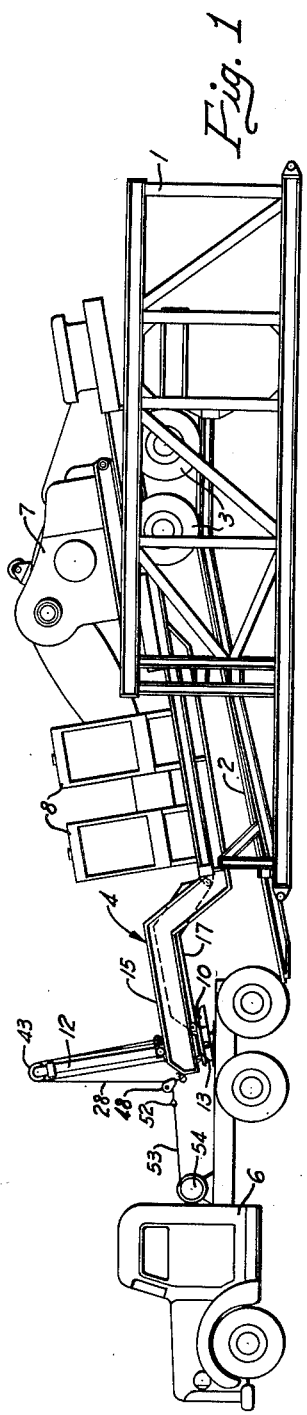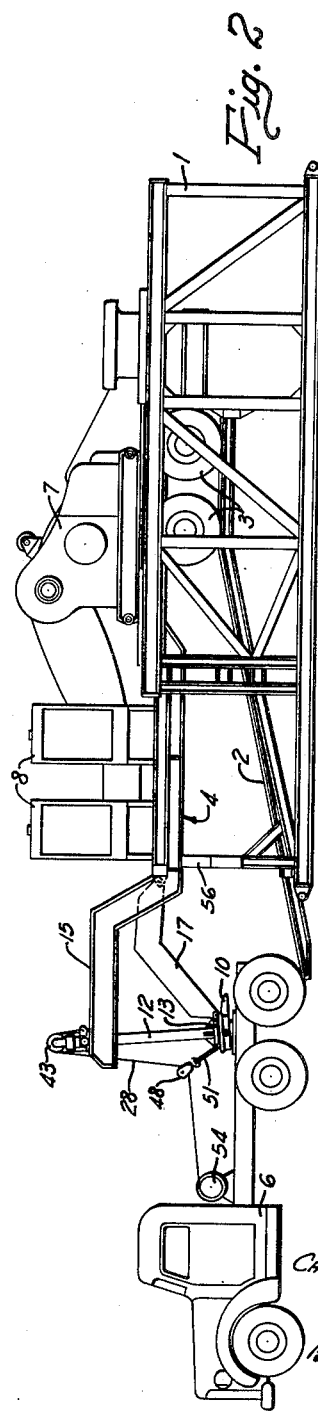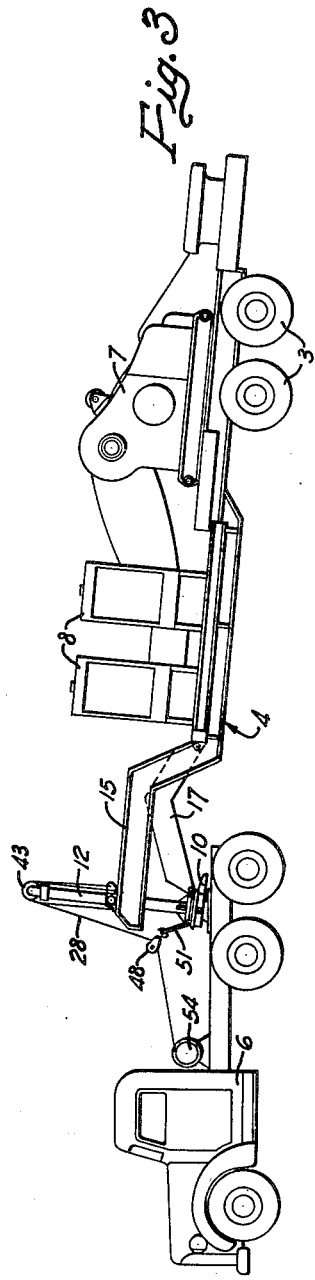
INVENTORS
CHARLES D. IDDINGS,
CECIL JENKINS AND
BY ERWIN A. CAMPBELL
THEIR ATTORNEYS

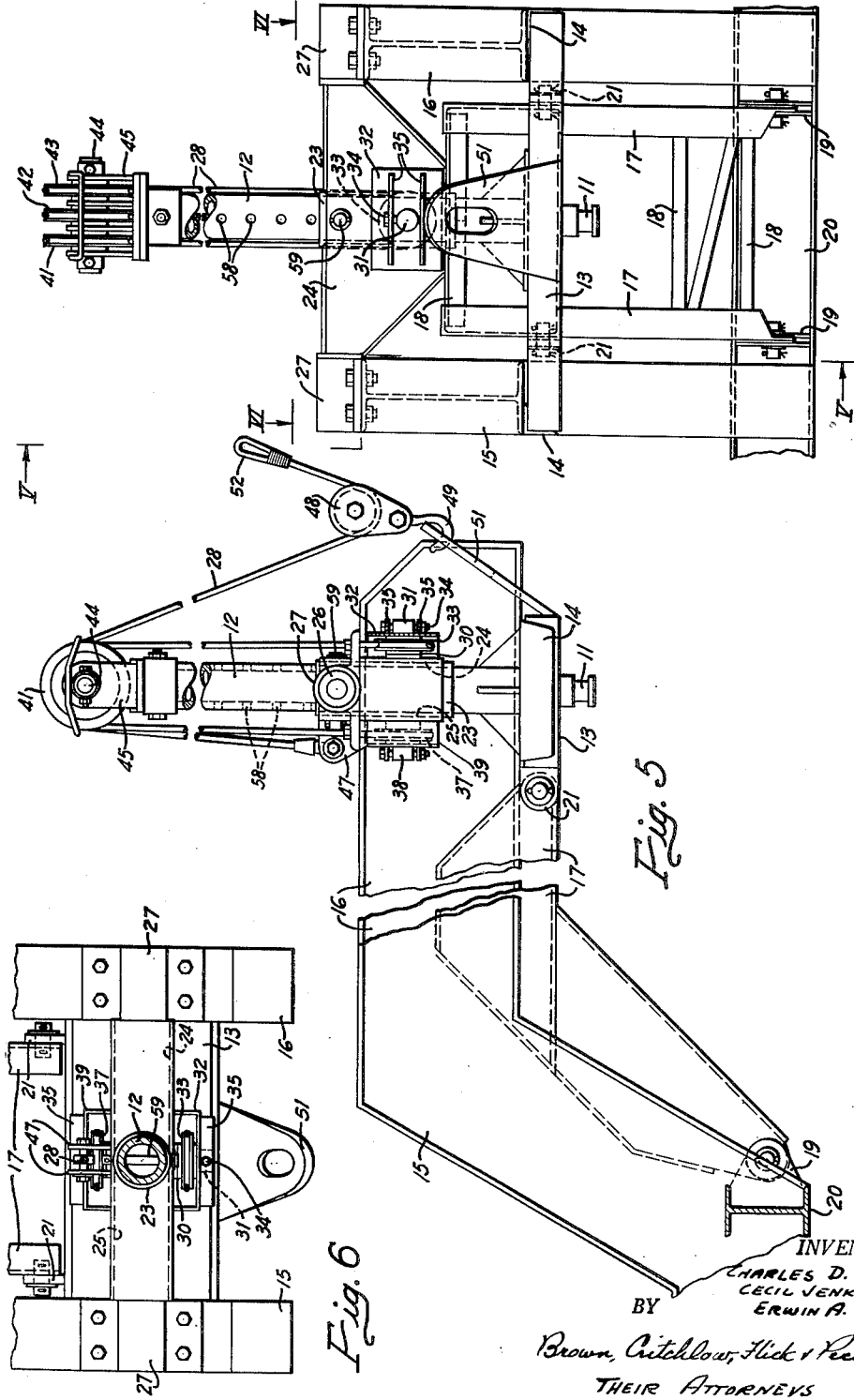

2,689,137

UNITED STATES PATENT OFFICE 2,689,137

TRUCK TRAILER WITH FIFTH WHEEL HOIST

Charles D. Iddings and Cecil Jenkins, Tulsa, Okla., and Erwin A. Campbell, Wexford, Pa., assignors to Lee C. Moore Corporation, Pittsburgh, Pa., a corporation of Pennsylvania Application September 1, 1953, Serial No. 377,882

8 Claims. (Cl. 280—425)

1

This invention relates to trailer trucks, and more particularly to built-in hoists or jacks for lifting the front ends of semi-trailers above the fifth wheels of the tractors to which they are attached.

As is well known, a truck tractor fifth wheel is mounted so that it can rock on a horizontal axis transverse to the tractor, and is provided with a slot extending forward from its back for receiving a vertical king pin on the bottom of the front end of the trailer. The pin is held in the slot by a latch. When it is desired to separate the tractor from the trailer, the front portion of the trailer has to be supported on something and then the fifth wheel latch is released from the king pin so that the tractor can be driven away. In some cases, before the tractor and trailer are separated, it is desired to back the trailer up an incline to a higher level. Then, in order to level the trailer, its front end has to be raised after it has been disconnected from the tractor. This generally requires considerable time and effort, since it usually has to be done by placing manually operable jacks beneath the trailer and then elevating them.

It is among the objects of this invention to provide a truck semi-trailer which has a hoist built into its front end for leveling the trailer, which can be leveled while it is still attached to the tractor, which has a built-in hoist that forms part of the connection between the trailer and the fifth wheel on the tractor, and which can be hauled by the tractor while the front end of the trailer is elevated above the fifth wheel.

In accordance with this invention the front end of a semi-trailer frame is provided with a pair of laterally spaced longitudinal beams, between the front ends of which a cross member is pivotally supported on a horizontal axis. A post extends through the cross member, in which it is slidable vertically. A king pin projects from the lower end of the post for connection to the fifth wheel of the tractor, by which the trailer is hauled. A vertically movable draw link has its opposite ends pivotally connected to the lower part of the post below the cross member and to the frame several feet behind the post. Sheaves are supported by the upper end of the post and the cross member. A line is reeved around the sheaves and has one end anchored near one of them. The opposite end of the line is adapted to be connected to a winch on the tractor. When the winch is operated to reel in the line, it lifts the front end of the frame by sliding the cross member upward on the post. After the front

2 end of the trailer is raised in this manner, it can be blocked up and the tractor driven away from it. This operation is just reversed when the tractor is brought back to hook onto the trailer. Means are provided for holding the cross member at different elevations on the post, so that when desired the front of the trailer can be held in elevated position while the trailer is being hauled by the tractor.

The preferred embodiment of the invention is illustrated in the accompanying drawings, in which Fig. 1 is a side view of our trailer just after it has been backed up a ramp in an oil well derrick substructure;

Fig. 2 is a side view showing the trailer after its front end has been elevated and blocked up, but before the tractor has been removed;

Fig. 3 shows the trailer removed from the substructure and in motion with its front end elevated;

Fig. 4 is an enlarged fragmentary front end view of the trailer;

Fig. 5 is a fragmentary side view of the front end of the trailer with part of one of the trailer beams removed; and Fig. 6 is a horizontal section taken on line VI—VI of Fig. 4.

Referring to Fig. 1 of the drawings, an oil well derrick substructure 1 of a familiar form is shown, which is bifurcated at one end to provide a deep recess in which ramps 2 are located. Resting on the horizontal upper portions of these ramps are the wheels 3 that support the rear end of the bed of a truck semi-trailer 4. The front end of the trailer is connected to the back of a tractor 6 in a manner that will be described presently. The tractor has just backed the trailer up the ramps, so the trailer is tilted down toward the tractor. Mounted on the trailer are the drawworks 7 and engines 8 that are to be used in a well drilling operation. Of course, as far as this invention is concerned, it is immaterial what is carried by the trailer and whether it is backed up into a substructure or onto some other elevated support.

The back part of the tractor is provided with the usual transversely pivoted fifth wheel 10 for detachable connection to the trailer to support its front end. The trailer is provided with a vertical king pin that is received by the standard latch (not shown) at the inner end of the customary slot in the fifth wheel. As shown in Figs. 4 and 5, the king pin 11 is rigidly mounted at the lower end of a post 12 that is mounted in the center of a bearing plate 13 that extends transversely of the trailer. This plate preferably is formed from a heavy channel that has angle irons 14 welded to its opposite ends to form seats for the front end of a pair of laterally spaced beams 15 and 16 extending lengthwise of the trailer and forming part of its frame. The forward portions of these beams are offset upwardly above the trailer bed to form a goose neck in a well known manner. When the trailer is connected to the tractor, the bearing plate 13 rests on the fifth wheel and normally supports the front end of the goose neck as shown in Figs. 1, 4 and 5.

In order to transmit the tractive force of the tractor to the trailer, bearing plate 13 is connected to the trailer frame by means of a vertically movable draw link. This link is formed from a pair of parallel arms 17 that have the general shape of the goose neck and that are rigidly connected by cross braces 18. That is, the arms have horizontal upper portions and downwardly and rearwardly inclined rear portions. The rear ends of the arms extend into brackets 19 projecting from the front of a horizontal element 20 connecting the longitudinal beams 15 and 16 at the base or rear end of the goose neck at a point several feet behind the bearing plate. The draw link is narrower than the space between the beams so that it can extend between them. The front ends of the link arms are pivotally connected to brackets 21 projecting from the back of the bearing plate.

The post 12 extends up through a sleeve 23 that is slidable on it. The sleeve is rigidly mounted in a cross member or yoke located between the front ends of the goose neck beams. The yoke or cross member preferably includes parallel front and rear vertical plates 24 and 25 and trunnions 26 projecting from its opposite ends. The trunnions are oscillatably mounted in pillow blocks 27 secured to the top of the goose neck beams. The pivotal connections described thus far permit the post and yoke to be moved vertically relative to each other. This movement is effected by a cable or line 28 extending around sheaves supported by the post and the yoke as now will be described.

Mounted on the front face of the front plate 24 of the yoke is a bearing 30 that supports the rear end of a short shaft 31. The front end of the shaft is supported by the front wall of a housing 32 welded to the plate and surrounding a sheave 33 journaled on the shaft within the housing. The shaft projects from the front of the housing and is held in place by a bolt 34 extending through it and parallel horizontal ribs 35 on the housing. A similar sheave 37 is mounted on a short shaft 38 supported by the back plate 25 of the yoke and a housing 39 in the same way. Three more sheaves 41, 42 and 43 are journaled on a horizontal shaft 44 at the top of the post. This shaft is disposed with its axis parallel to the axis of trunnions 26 and is mounted in a forked member 45 secured to the top of the post. Passing around all of of these sheaves is a line 28.

Although the line can be reeved around the sheaves in different ways, for maximum strength and stability it is preferred to anchor the rear end of the line to a lug 47 fastened in the rear plate 25 of the yoke near its center. The line then extends up and forward over the top of the center sheave 42 and down around the sheave 33 in front of the yoke. From there the line extends up and over end sheave 43 on the post and down around the sheave 37 behind the yoke. The line then extends up and over the other end sheave 41 and down and under a snatch block sheave 48 in front of the yoke. The snatch block includes a hook 49 that is hooked into the upper end of a supporting plate 51 inclined downward and rearward to the front of bearing plate 13, to which it is welded. From the snatch block the line extends forward a short distance and has its front end provided with an eye 52 so that it can be fastened to a cable 53 attached to a winch 54, with which tractors of the type used with these trailers are usually equipped.

After the trailer has been backed up the ramp as shown in Fig. 1, the winch is operated to reel in cable 53 and the hoist line 28 attached to it. This causes the line to lift the lower sheaves 33 and 37 and thereby slide the yoke and front end of the trailer frame or goose neck up the stationary post until a cross beam 56 can be placed under the trailer bed at the base of the goose neck. Then the trailer is lowered onto the beam, as shown in Fig. 2, which holds the trailer level. The tension on the hoist line then can be released and the line disconnected from the winch cable, whereupon the fifth wheel 10 can be unlatched from king pin 11 and the tractor driven away from the trailer.

To prevent post 12 from sliding down when the fifth wheel 10 is removed from beneath it, so that the post will not have to be raised again before the fifth wheel can be backed under it, the post is provided with a series of vertically spaced pairs of aligned holes 58 adapted to be aligned with similar holes extending through the front and back of the yoke and sleeve 23. A locking pin 59 is inserted through the aligned holes to connect the post rigidly to the sleeve and prevent any relative sliding movement. This pin and the holes that receive it also serve another purpose. There may be times while the trailer is being hauled when it becomes desirable to elevate the goose neck; for example, when the trailer wheels sink into the ground or when the trailer might drag on a sudden rise of ground. In such cases the front end of the trailer can be raised by having the winch wind up the hoist line, and then locking pin 59 can be inserted in the post at a higher level, as shown in Fig. 3. Since the pull on the trailer always is through the bearing plate and draw link, the post will not be bent rearwardly by the goose neck as it might be if the pull were exerted by the goose neck at the level of the yoke.

The pivotal connections between the yoke and goose neck and between the draw link and the trailer frame and bearing plate allow the post and the rest of the trailer to adjust themselves to each other whether the trailer is horizontal elevated or tilted forward or backward. When the front ends of the goose neck and draw link are widely spaced as in Fig. 2, it will be seen that post 12 is tilted forward, but when the goose neck and draw link are in the positions shown in Fig. 3, the post is tilted backward relative to the goose neck. The location of the pivots at the rear end of the draw link below the level of the pivots at its front end minimizes a deviation in motion of the front pivots from a vertical line when they are lowered relative to the yoke from their upper position.

It will be seen that with the construction disclosed herein, there are no separate jacks to operate and little human energy is required for raising the front end of the trailer. The hoist always is in position as a part of the connection between the trailer and tractor. It takes only a moment to operate the hoist, and usually does not require any extra equipment because the tractors that haul this kind of trailer generally are provided with winches and snatch blocks. A big advantage of this invention is that the trailer can be hauled safely while its front end is elevated above its normal running position, as shown in Fig. 3.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. A truck semi-trailer for use with a tractor having a fifth wheel and a winch, the trailer comprising a frame provided with a pair of laterally spaced beams extending lengthwise of the frame, a cross member between the front ends of the beams and pivotally supported thereby on a horizontal axis, a post extending through said cross member and slidable vertically therein, a king pin projecting from the lower end of the post adapted to connect the trailer to the fifth wheel of a tractor, a vertically movable draw link having its opposite ends pivotally connected to the lower part of the post below said cross member and to said frame several feet behind the post, sheaves supported by the upper end of the post and said cross member, and a line reeved around said sheaves with one end anchored near one of them and with the opposite end adapted to be connected to a winch on the tractor, whereby said cross member can be slid upward on the post to elevate the front end of the frame.

2. A semi-trailer in accordance with claim 1, including detachable means for holding the cross member at different elevations on the post.

3. A truck semi-trailer for use with a tractor having a fifth wheel and a winch, the trailer comprising a frame provided with a pair of laterally spaced beams extending lengthwise of the frame, a cross member between the front ends of the beams and pivotally supported thereby on a horizontal axis, a post extending through said cross member and slidable vertically therein, a king pin projecting from the lower end of the post adapted to connect the trailer to the fifth wheel of a tractor, a bearing plate rigidly mounted on the lower end of the post and extending laterally in opposite directions therefrom to normally support the front ends of said beams, a vertically movable draw link having its opposite ends pivotally connected to said bearing plate and to said frame several feet behind the plate, sheaves supported by the upper end of the post and said cross member, and a line reeved around said sheaves with one end anchored near one of them and with the opposite end adapted to be connected to a winch on the tractor, whereby said cross member can be slid upward on the post to elevate the front end of the frame.

4. A truck semi-trailer for use with a tractor having a fifth wheel and a winch, the trailer comprising a frame provided with a pair of laterally spaced beams extending lengthwise of the frame and having upwardly offset front portions forming a goose neck, a cross member between the front ends of the beams and pivotally supported thereby on a horizontal axis, a post extending through said cross member and slidable vertically therein, a king pin projecting from the lower end of the post adapted to connect the trailer to the fifth wheel of a tractor, a vertically movable draw link having its opposite ends pivotally connected to the lower part of the post below said cross member and to said frame at the base of the goose neck, sheaves supported by the upper end of the post and said cross member, a line reeved around said sheaves with one end anchored near one of them and with the opposite end adapted to be connected to a winch on the tractor, whereby said cross member can be slid upward on the post to elevate the goose neck, and detachable means for holding the cross member at different elevations on the post.

5. A truck semi-trailer for use with a tractor having a fifth wheel and a winch, the trailer comprising a frame provided with a pair of laterally spaced beams extending lengthwise of the frame, a vertical sleeve between the front ends of the beams, means rigidly supporting the sleeve and pivotally supported by the beams on a horizontal axis, a post slidably mounted in the sleeve and projecting from its opposite ends, a king pin projecting from the lower end of the post adapted to connect the trailer to the fifth wheel of a tractor, a vertically movable draw link having its opposite ends pivotally connected to the lower part of the post below the sleeve and to said frame several feet behind the post, sheaves supported by the upper end of the post and said means, a line reeved around said sheaves with one end anchored near one of them and with the opposite end adapted to be connected to a winch on the tractor, whereby said sleeve can be slid upward on the post to elevate the front end of the frame, the post being provided with vertically spaced holes, and a pin insertable in any of the holes for holding the sleeve at different elevations on the post.

6. A truck semi-trailer for use with a tractor having a fifth wheel and a winch, the trailer comprising a frame provided with a pair of laterally spaced beams extending lengthwise of the frame, a yoke pivotally supported on the front ends of the beams on a horizontal axis and suspended between them, a post extending through the yoke and slidable vertically therein, a king pin projecting from the lower end of the post adapted to connect the trailer to the fifth wheel of a tractor, a vertically movable draw link having its opposite ends pivotally connected to the lower part of the post below the yoke and to said frame several feet behind the post, three sheaves mounted on the upper end of the post, a pair of sheaves supported by the yoke on opposite sides of the post, and a line having one end anchored to the yoke and extending upward therefrom and over the center upper sheaves and down around the sheave below it and then up and over one of the other upper sheaves and down around the other lower sheave and then up and over the remaining upper sheave, the opposite end of the line being adapted to be connected to a winch on the tractor, whereby the yoke can be slid upward on the post to elevate the front end of the frame.

7. A truck semi-trailer for use with a tractor having a fifth wheel and a winch, the trailer comprising a frame provided with a pair of laterally spaced beams extending lengthwise of the frame, a yoke pivotally supported on the front ends of the beams on a horizontal axis and suspended between them, a post extending through the yoke and slidable vertically therein, a king pin projecting from the lower end of the post adapted to connect the trailer to the fifth wheel of a tractor, a vertically movable draw link having its opposite ends pivotally connected to the lower part of the post below the yoke and to said frame several feet behind the post, sheaves supported by the upper end of the post and the yoke, a snatch block support in front of the post connected with the lower part of the post, and a line reeved around said sheaves and having one end anchored to the yoke, the opposite end portion of the line being adapted to extend forward through a snatch block connected to said support to a winch on the tractor, whereby the yoke can be slid upward on the post to elevate the front end of the frame.

8. A truck semi-trailer for use with a tractor having a fifth wheel and a winch, the trailer comprising a frame provided with a pair of laterally spaced beams extending lengthwise of the frame, a cross member between the front ends of the beams and pivotally supported thereby on a horizontal axis, a post extending through said cross member and slidable vertically therein, a king pin projecting from the lower end of the post adapted to connect the trailer to the fifth wheel of a tractor, a bearing plate rigidly mounted on the lower end of the post and extending laterally in opposite directions therefrom to normally support the front ends of said beams, a vertically movable draw link having its opposite ends pivotally connected to said bearing plate and to said frame several feet behind the plate, sheaves supported by the upper end of the post and said cross member, a snatch block support in front of the post having a lower end secured to said bearing plate, a line reeved around said sheaves with one end anchored to said cross member and with its opposite end adapted to extend forward through a snatch block connected to said support to a winch on the tractor, whereby said cross member can be slid upward on the post to elevate the front end of the frame.

References Cited in the file of this patent

UNITED STATES PATENTS

| Number | Name | Date |
|---|---|---|
| 1,546,261 | Spencer | July 14, 1925 |
| 1,590,615 | Culver | June 29, 1926 |